United States Patent Office 3,164,096
Patented Jan. 5, 1965

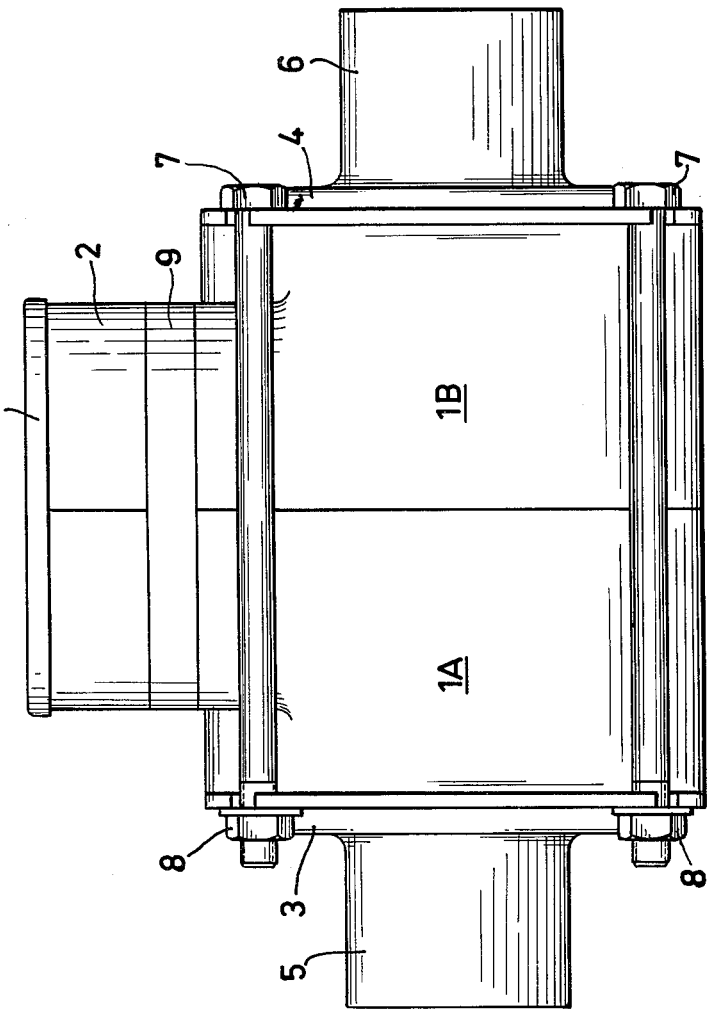

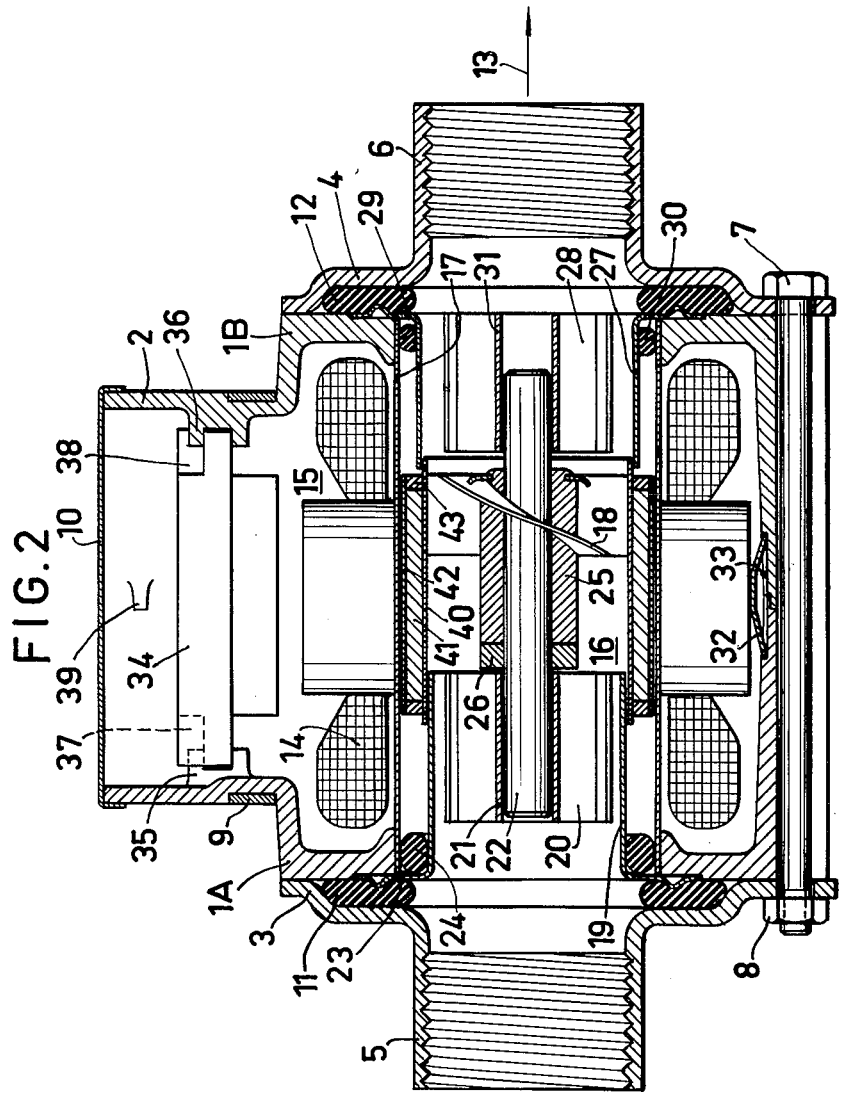

3,164,096
PUMPS WITH INCORPORATED MOTOR
Stig Lennart Hallerback, Sodertalje, Sweden, assignor to Aktiebolaget W. Dan Bergman, Sodertalje, Sweden, a Swedish corporation
Filed Feb. 18, 1963, Ser. No. 259,210
Claims priority, application Sweden, Sept. 24, 1962, 10,246/62
6 Claims. (Cl. 103—87)

This invention relates to pumps provided with an incorporated electric motor, wherein the pump fluid flows centrally through the stator axially thereof, and with one or more rotors, which preferably are formed as pump impellers, disposed in the fluid chamber.

It is an object of the invention to provide a pump of the kind specified which is particularly suited for use as a circulation pump in a central heating system, although it may be suited for other purposes, as well.

It is a further object to provide such a pump which is unfailing in operation and may be used without inspection and maintenance, such as lubrication, during many years without disturbances.

It is a still further object to provide a pump of the kind specified which may be built to a high precision and with very small tolerances in the bearings, in such a manner as to allow the installation of the pump as a floating unit in a pipe system without the need for any outside pump supporting structure.

It is a still further object of the invention to provide a pump having a housing which will stand up to tension stresses imposed by the installation in a piping system without transmitting those stresses to any working parts of the pump.

With this and other objects in view, a specific embodiment of the invention will now be described more in detail, reference being had to the annexed drawings.

FIG. 1 is an elevation view of a pump according to the invention.

FIG. 2 is an axial section through the pump illustrated in FIG. 1.

The pump housing illustrated in FIG. 1 is divided transversally in two similar halves 1A and 1B. This pump housing is formed integrally with a laterally offset portion 2 which is adapted to receive a connection terminal plate 34 (FIG. 2). End plates 3 and 4 are provided for the housing, each one formed like a pipe flange with a central spigot member 5 or 6, respectively, for connecting the pump to pipes (not illustrated) associated with a central heating system or the like, by threads or by welding, for example. The end plates 3 and 4 are clamped together by means of a number of clamping bolts 7 provided with nuts 8, and the housing halves 1A and 1B are sandwiched between said end plates.

When the clamping bolts 7, 8 are not mounted, the housing halves 1A and 1B may be held together by means of a U-shaped spring clamp 9 placed over the laterally projecting and radially divided offset portion 2. For that purpose, a corresponding groove is preferably formed in the outer surface of the portion 2. A cover 10 is mounted across the free, open end of the portion 2.

Referring now more specifically to FIG. 2, the two halves 1A and 1B of the divided pump housing are shaped at one side to form the offset portion 2. The two halves 1A and 1B are guided circumferentially and radially relative to each other by guide lugs 39 which are formed in one housing half along its surface of engagement with the other housing half, and which project and engage inside the edge of the other housing half at the common plane of division.

The sealing between the housing halves 1A and 1B and the respective end plates 3 and 4 is effected with soft and/or resilient packing rings 11 and 12, respectively, which are interposed between the housing halves and their respective end plates.

The flow direction of the pumped liquid is denoted by the arrow 13.

In the pump housing, a stator 14 for the electric drive motor is disposed. An outer chamber 15 enclosing the stator 14 is separated from hollow cylindrical rotor 16, which also is the pump impeller, by a thin-walled fluid-tight cylindrical sleeve 17. This sleeve 17 is axially movably suspended in the inlet and outlet ports, respectively, of the pump housing. The rotor 16 is provided with blades 18, preferably of stainless sheet metal and formed in such a way, that they are brought to hold bearing sleeve 25 in a tight grip upon compressing the outer, cylindrical portion of the rotor, and they will consequently form spoke members in the rotor. The outer cylindrical portion of the rotor comprises a sleeve 40 which is preferably made of stainless sheet metal, with a cylindrical outer sheath 41 of a mild magnetic material. A copper layer 42 is electrolytically deposited externally on the sheath 41 and the ends of sleeve 40 protrude therefrom. To attain a higher degree of electrical efficiency, short circuiting rings 43, made of copper, for instance, may be mounted at the ends of sheath 41 and electrolytically joined to the copper layer 42.

In the inlet port of the pump an inlet insert 19, preferably of stainless material, may be mounted. The insert 19 is provided with inlet guide vanes 20 which are formed with a central, cylindrical hub portion 21 in which shaft 22 has a tight fit. The inlet insert is provided with a radial end flange 23 at which it is pressed against the pump housing by the end plate 3 and the packing ring 11. Between the inlet insert and the impervious sleeve 17, an O-ring 24 is placed at the inlet end of sleeve 17 for sealing off the fluid chamber.

The inner end of insert 19 extends beyond the upstream end of pump rotor 16 and penetrates a certain distance into the latter, thus preventing foreign particles in the pumped fluid to reach the narrow gap between the pump rotor and sleeve 17 which might otherwise give rise to operational disturbances and damage. The impeller rotates freely on the shaft 22 by means of its bearing sleeve 25. The shaft is tightly secured in the hub portion 21, and a thrust bearing 26 is mounted on the shaft.

At the downstream end the rotor 16 is formed with a smaller diameter, and is overlapped externally by an outlet insert 27 provided with outlet guide vanes 28, and in other respects disposed and retained in a similar manner as the inlet insert 19 by its flange 29 being pressed against the pump housing by the end plate 4 and packing ring 12.

The overlap serves also in this instance to prevent foreign particles in the pumped fluid penetrating into the narrow gap between the rotor and sleeve 17. An O-ring 30 is provided at the outlet end, and it serves the same purpose as the O-ring 24 at the inlet end. The outlet insert 27 is formed with a central cylindrical hub portion 31 in the same way as inlet insert 19, and said hub portion 31 surrounds shaft 22. By dimensioning the interior diameter of hub portions 21 and 31 in such a way that the shaft has to be fitted by pressure when assembling the pump, the pump housing halves 1A and 1B will be held together by shaft 22, hub portions 21 and 31, the inlet insert 19 and outlet insert 27 with their respective flanges 23 and 29, when the pump has not been installed in a piping system.

The stator 14 is kept in position circumferentially as well as axially by guide lugs 32 secured thereto and engaging corresponding grooves 33 formed in the pump housing halves.

The connection terminal plate 34 for connecting the pump motor to an electric distribution network is supported by lugs 35 and 36, formed integrally with the lateral offset portion 2, at the inner surface thereof. Lugs 35 and 36 ingage with each end of the connection plate by grooves 37 and 38 formed in the latter.

Upon faulty electrical connection of the drive motor, it may happen that the rotor will rotate in the wrong direction. The pump impeller is, however, dimensioned in such a way, that it will be displaced towards the outlet end of the pump by the reversed hydraulic reaction pressure, no matter how the pump is mounted (vertically with inlet lower and outlet higher, or inversed, or horizontally). The rotor will lose its contact with the thrust bearing 26, and instead it will abut the outlet insert 27 and this will give rise to such a noise that the faulty connection is discovered in every case.

The rotor shaft 22 may be supported by the inlet insert 19 alone, or the outlet insert 27 alone, instead of being supported by both. The shaft 22 may be secured to the rotor 16, and may be rotatably journalled in the hub portion 21 or 31, or both.

The clamping bolts 7 which are shown as extending wholly exteriorly of the pump housing may as well extend within the pump housing and pass through clearance holes in the end walls of the pump housing. For the sake of clarity, one of the clamping bolts 7 in FIG. 1 has been illustrated in a slightly different position in FIG. 2, whereas the other bolt shown in FIG. 1 has been omitted. It will be seen that the resilient suspension of the inserts 19, 27 with the shaft bearings will protect the moving parts of the pump from all outward forces caused by forces acting in the pipes or pump housing, and thus there will be no risk that stresses will give rise to deformations apt to distort the alignment of bearings or smooth running of the rotor.

The inserts may be secured in manners other than that which has been described, such as for instance in a permanent manner by casting, riveting, or the like.

The described construction affords further advantages beyond eliminating the risk for displacement of the bearings relative to the shaft, particularly upon assembly of the pump. As the pump housing is completely free from tension stresses when the pump is installed in a piping system, the housing may be divided, as shown, without any joining elements in the form of bolts or the like, for taking up tensional stresses in the pump housing. By that means, all internal pump elements may be placed in one housing portion on assembly, whereafter the mating housing portion with its insert 19 ar 27 is brought to abut the other portion without any need for tightening screw connections or the like.

The described construction which affords a pump housing completely free from tensional stresses when installed in a piping system may be formed very light and thin-walled, and may advantageously be manufactured by die-casting processes with very great economical advantage.

What I claim is:

1. In a pump having an incorporated electric drive motor a pump housing divided perpendicularly to the pump axis in two substantially like parts, said housing being formed with a laterally offset portion covered by a removable lid, said offset portion being symmetrically divided by the plane dividing the pump housing in two parts, electrical connecting terminal plate means provided inside said laterally offset portion to be supported thereby, a thin-walled fluid-tight sleeve member defining a central fluid passage through said pump housing, shaft means and bearing means therefor, a combined rotor and impeller assembly mounted on said shaft means for rotation thereon, stator means disposed within said pump housing outside of said sleeve member, end plate members adapted to support between themselves said pump housing, clamping bolt means, adapted to engage and join said end plate members to compress and support said pump housing therebetween, said end plates being formed with outwardly projecting pipe union members opposite the ends of said fluid passage, a packing ring of a soft material disposed between each of said end plate members and the pump housing concentrically of said central passage, a non corrosive sheet metal assembly having an outer jacket formed with a radial end flange having its flange clamped and rigidly retained between said packing ring and the housing, said jacket projecting into said central passage, guide vanes being provided between said outer jacket and a hub member formed centrally thereof, said hub members being adapted to hold rigidly said shaft means at each end thereof, said rotor and impeller assembly formed with a bearing bush adapted to rotate on said shaft means, thrust bearing means being provided to absorb axial forces, said bearing bush supporting impeller blading.

2. A pump as claimed in claim 1, wherein a spring clamp is provided, adapted to slip over the laterally offset housing portion to hold together the housing parts even in absence of said clamping bolt means.

3. A pump as claimed in claim 1, wherein said sheet metal assembly provided at the inlet end of the fluid passage has its jacket projecting into the rotor and impeller assembly, inlet guide vanes extending between said hub member and said jacket.

4. A pump as claimed in claim 1, wherein said sheet metal assembly provided at the outlet end of the fluid passage has its jacket projecting to overlap exteriorly the rotor and impeller assembly, outlet guide vanes extending between said hub member and said jacket.

5. A pump as claimed in claim 1 wherein the pump housing parts are held together by the shaft means.

6. A pump as claimed in claim 1, wherein there are supporting lug means formed integrally with the inside wall of said laterally offset housing portion to engage and hold said connection terminal plate means in a predetermined position.

References Cited by the Examiner
UNITED STATES PATENTS

| | | | |
|---|---|---|---|
| 2,688,930 | 9/54 | De Moss | 103—111 |
| 2,697,986 | 12/54 | Meagher | 103—87 |
| 2,753,806 | 7/56 | White | 103—87 |
| 2,958,296 | 11/60 | Carter | 103—87 |

LAURENCE V. EFNER, *Primary Examiner.*

ROBERT M. WALKER, JOSEPH H. BRANSON, JR.,
*Examiners.*